United States Patent Office 2,733,268
Patented Jan. 31, 1956

2,733,268
1-CHLORO-2,3-BUTANEDIONE-3-OXIME

Mona Phyllis Doerner, Walnut Creek, Calif., assignor to The Dow Chemical Company, Midland, Mich., a corporation of Delaware No Drawing. Application July 21, 1953,
Serial No. 369,527

2 Claims. (Cl. 260—566)

This invention is directed to the novel chemical compound 1-chloro-2,3-butanedione-3-oxime and a method for its synthesis. The compound has the structural formula

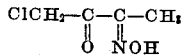

It is a white crystalline solid melting at 118° C. readily soluble in diethyl ether and many other organic solvents, and difficultly soluble in water. The new compound has many potential uses, but has been found particularly valuable as the active parasiticidal ingredient of fungicide compositions. The compound is prepared as follows:

69.5 grams (1.0 mole) of hydroxylamine hydrochloride was dissolved in 400 milliliters of water. To this solution there was added portionwise and with continuing efficient agitation, 52.4 grams (0.624 mole) of sodium bicarbonate. The resultant mixture was cooled to —5° C., and 120.5 grams (1.0 mole) of freshly distilled 1-chloro-2,3-butanedione added portionwise thereto with stirring, the temperature of the reaction mixture being kept at 0°±5° C. by external cooling in a reaction bath of solid carbondioxide-acetone mixture. When all of the butanedione compound had been added, the reaction mixture was stirred for an additional 45 minutes, during which time a solid reaction product precipitated from solution. This solid product was separated by filtration, washed with 500 milliliters of ice water, and taken up in diethyl ether. The aqueous filtrate from the original separation was extracted with diethyl ether and the two ether solutions combined and dried over anhydrous sodium sulfate. Evaporation of the dried ether solution resulted in the recovery of 4 crops of white crystals totaling 98.8 grams. The first crop of crystals melted at 118° C. and contained 26.61 per cent by weight of chlorine as compared to a theoretical chlorine content of 26.8 per cent for 1-chloro-2,3-butanedione-3-oxime.

A fungicide composition containing the 1-chloro-2,3-butanedione-3-oxime as prepared above in a concentration of 100 parts per million by weight was found to give controls of 86 per cent against the organism *Rhizoctonia sp.*, and 100 per cent against the organisms *Fusarium sp.*, *Verticillium alboatrum*, and *Pythium ultimum*.

I claim:

1. The compound 1-chloro-2,3-butanedione-3-oxime having the structural formula

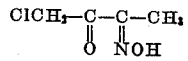

2. A method for the preparation of 1-chloro-2,3-butanedione-3-oxime which comprises the step of reacting 1-chloro-2,3-butanedione with hydroxylamine.

References Cited in the file of this patent

Diels et al.: Ber. Deut. Chem. 43, 1957–1962 (1910).
Garreau: Compt. Rend. 224, 841–2 (1947).
Richter: Textbook of Org. Chem. (1938 ed.), page 100.